US000001878H

United States Statutory Invention Registration [19]

[11] Reg. Number: H1,878

Greer et al.

[45] Published: Oct. 3, 2000

[54] ELECTRONIC CHART ASSISTED NAVIGATION SYSTEM

[75] Inventors: Robert A. Greer; Miroslav Stamenkovich, both of Virginia Beach, Va.

[73] Assignee: The United States of America as represented by the Secretary of the Navy, Washington, D.C.

[21] Appl. No.: 08/999,558

[22] Filed: Dec. 11, 1997

[51] Int. Cl.[7] ..... G01S 5/02

[52] U.S. Cl. ..... 342/357.13; 701/213

*Primary Examiner*—Daniel T. Pihulic
*Attorney, Agent, or Firm*—Harvey Fendelman; Michael A. Kagan; Eric James Whitesell

[57] ABSTRACT

The automated charting system of the present invention comprises a computer program for inputting current position from the Global Positioning System, accessing the Digital Nautical Chart database (DNC), selecting the best available nautical chart data for the current position, and displaying the current position on the selected nautical chart.

1 Claim, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Microfiche Appendix Included
(1 Microfiche, 192 Pages)

ELECTRONIC CHART ASSISTED NAVIGATION SYSTEM

MICROFICHE APPENDIX

This application contains a Microfiche Appendix having 1 microfiche and 192 frames.

BACKGROUND OF THE INVENTION

The present invention relates to an automated navigational charting system for use with the Digital Nautical Chart database developed by the National Imagery and Mapping Agency. More specifically, but without limitation thereto, the present invention relates to a computer program for displaying nautical chart information corresponding to ownship position data from the Global Positioning System.

A traditional method for ship navigation is to plot information on a paper nautical chart on the bridge, and in the Navy's case, in the Combat Information Center. The information is collected from visual observation, reports by other members of the crew, readings from navigation systems onboard, e.g. GPS ownship position in latitude and longitude, range and bearings observed by watchstanders, dead reckoning data including speed and heading, and other information. The date recorded on the paper chart is often subject to interpretation by the navigator and is subject to human error in collecting or recording data. The traditional navigation method therefore suffers the disadvantages of being labor intensive, requiring extensive training, and being subject to human error.

Currently available electronic charts are typically raster scanned paper charts that have limited resolution, and generally require operator input of reference points and ownship position.

A need therefore exists for an automated navigation system that offers greater accuracy and reliability than current methods afford.

SUMMARY OF THE INVENTION

The automated charting system of the present invention is directed to overcoming the problems described above, and may provide further related advantages. No embodiment of the present invention described herein should be construed to preclude other embodiments or advantages that may exist or become obvious to those skilled in the art.

The automated charting system of the present invention comprises a computer program for inputting current position from the Global Positioning System, accessing the Digital Nautical Chart database (DNC), selecting the best available nautical chart data for the current position, and displaying the current position on the selected nautical chart.

An advantage of the automated charting system of the present invention is that no paper nautical charts are required.

Another advantage is that the Digital Nautical Chart database is updated regularly and may be downloaded and accessed electronically.

Yet another advantage is that the current position data is input automatically from the Global Positioning System and does not require inputs from a watchstander.

Still another advantage of the automated charting system is that course plotting instruments may be incorporated electronically and used by personnel requiring substantially less training than for the use of mechanical instruments.

Another advantage is that the automated charting system of the present invention conforms to the Electronic Chart Display and Information System Performance Standards (ECDIS) developed by the International Maritime Organization and the International Hydrographic Organization for use with the Digital Nautical Chart database.

Yet another advantage is that the Digital Nautical Chart database has a Vector Product Format that has higher resolution than the raster scan format.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Figure 1:
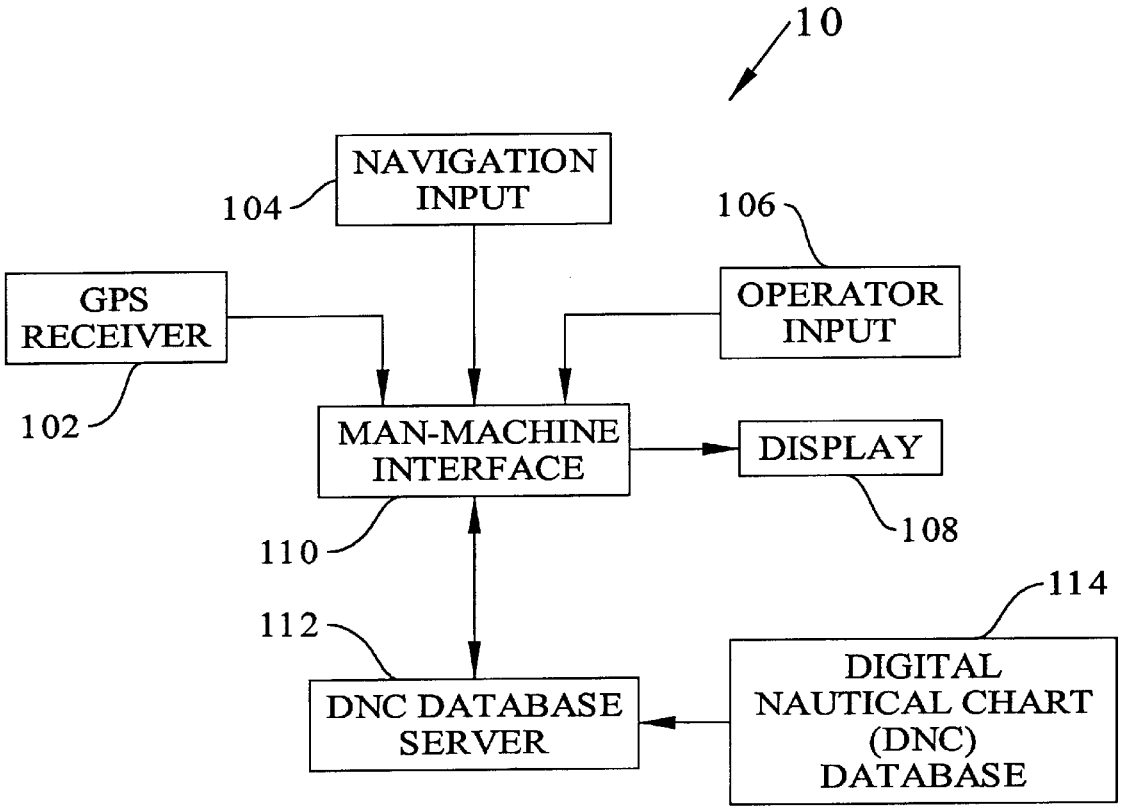
FIG. 1 is a diagram of an automated navigation system of the present invention.

FIG. 1 is a diagram of an automated navigation system 10 of the present invention comprising a Global Positioning System (GPS) receiver 102, a navigation input 104, an operator input 106, a display 108, a man-machine interface 110, a Digital Nautical Chart Database (DNC) Server 112, and a DNC Database 114. Man-machine interface 110 receives inputs from GPS receiver 102, navigation input 104, and operator input 106 to determine the latitude and longitude coordinates to be charted and displayed. GPS receiver 102 may be, for example, a commercially available GPS receiver with an output for connection to a serial port of a computer. Navigation input 104 may be incorporated to relay navigation information from shipboard radar and other instrumentation used to determine ownship position. Operator input 106 may be, for example, a keyboard for inputting optional charting coordinates and for selecting overlays and drawing tools for making course plots. Display 108 may be, for example, a computer monitor. Man-machine interface 110 may be, for example, a desktop computer. DNC database server 112 may be, for example, a software driver and a CD-ROM drive for loading DNC database 114. DNC database 114 is in production by the National Imagery and Mapping Agency and is described in the product specification MIL-D-89023.

In operation, DNC server 112 inputs chart coordinates from man-machine interface 110. DNC server 112 retrieves the appropriate chart data from DNC database 114 and outputs the data in Electronic Chart Display and Information System (ECDIS) format to man-machine interface 110. Man-machine interface 110 reformats the ECDIS data from Vector Product Format (VPF) and outputs the reformatted data to display 108.

Figure 2:
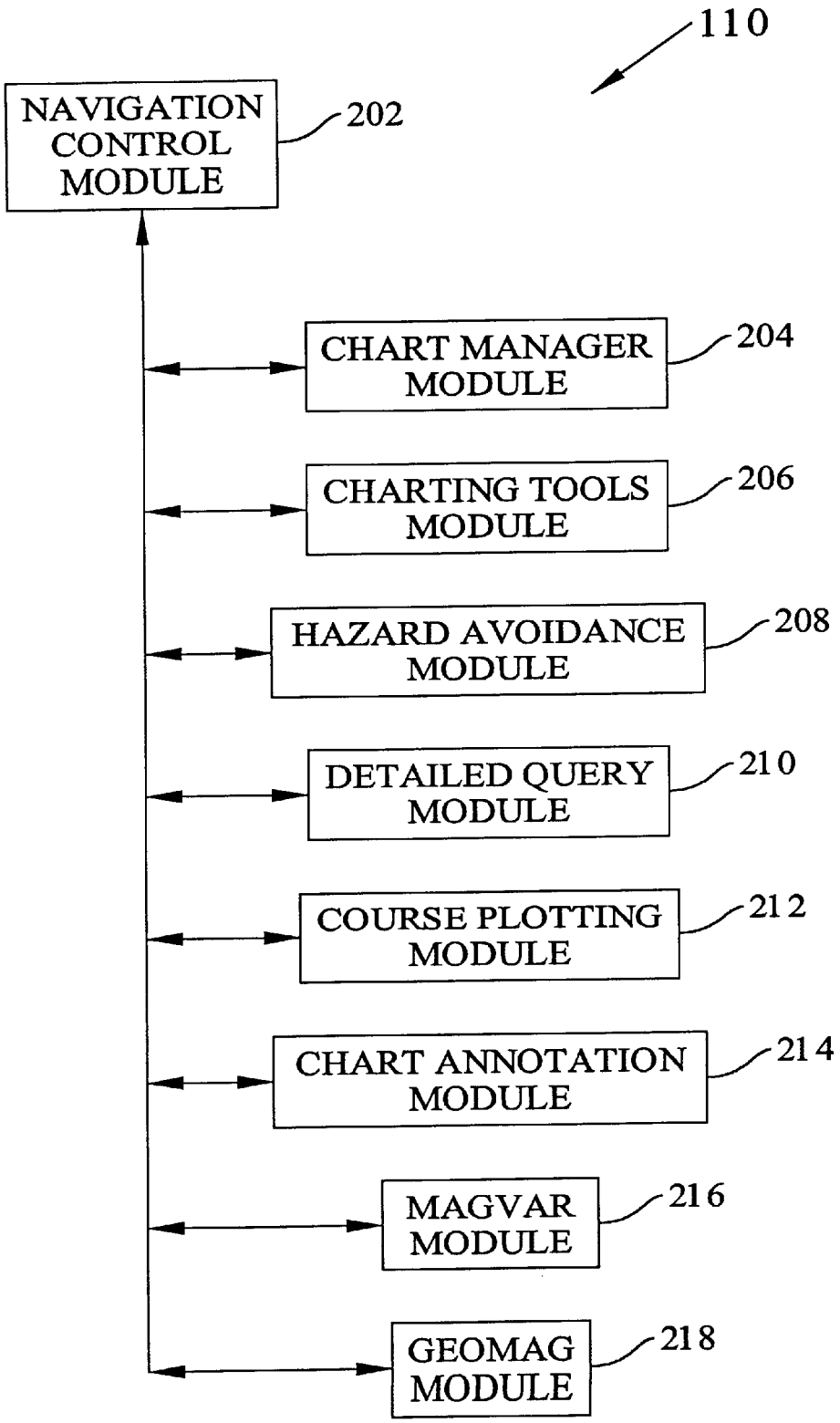
FIG. 2 is a detailed diagram of an exemplary man-machine interface.

FIG. 2 is a detailed diagram of an exemplary man-machine interface (MMI) 110. A navigational control module 202 inputs navigation data from navigation input 104 and distributes the information to the appropriate modules in MMI 110. Chart manager module 204 predicts future position from the navigation data for retrieving charts with position changes. Charting tools module 206 provides charting aids such as range rings, bearing lines, and bearing markers. Hazard avoidance module 208 predicts possible collisions with radar targets and potentially dangerous charted features and highlights them on the charts. Spatial Query module 210 accesses additional DNC database information that may be available for particular chart features. Course plotting module 212 may be used to plan routes for comparison with actual course and for navigation simulations. Chart annotation module 214 may be used to overlay charts with comments and figures to display additional information of a geographic area based on personal knowledge in accordance with International Maritime Organization (IMO) and ECDIS standards. MAGVAR module 216 may be used to display the local magnetic variation in accordance with IMO and ECDIS standards. GEOMAG module 218 may be used to calculate local magnetic force vectors from the Department of Defense World Magnetic Model. The model is updated every five years.

Figures 3, 3A, 3B:
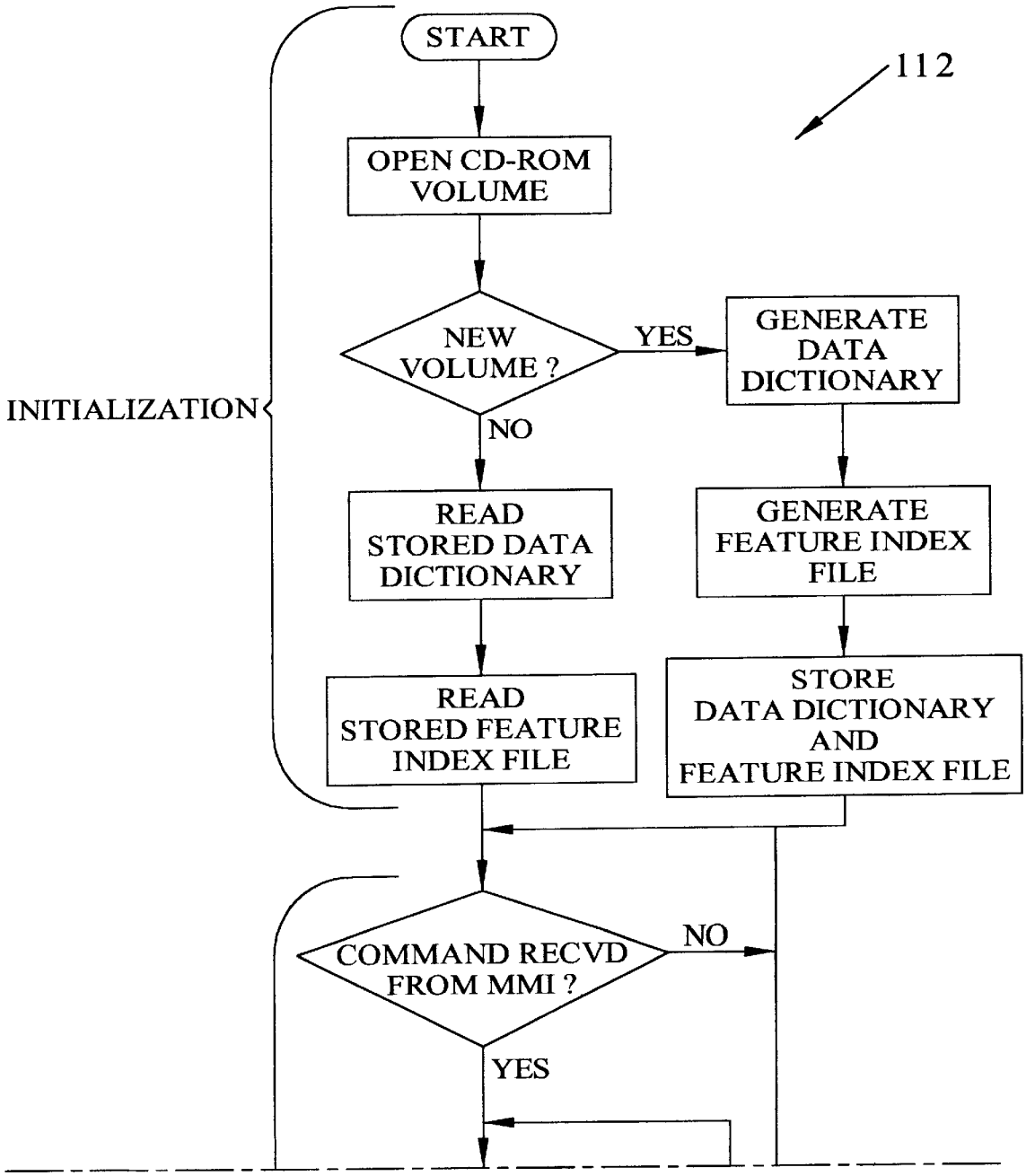
FIGS. 3, 3A and 3B are a flowchart of an exemplary DNC database server.
Figure 3B:
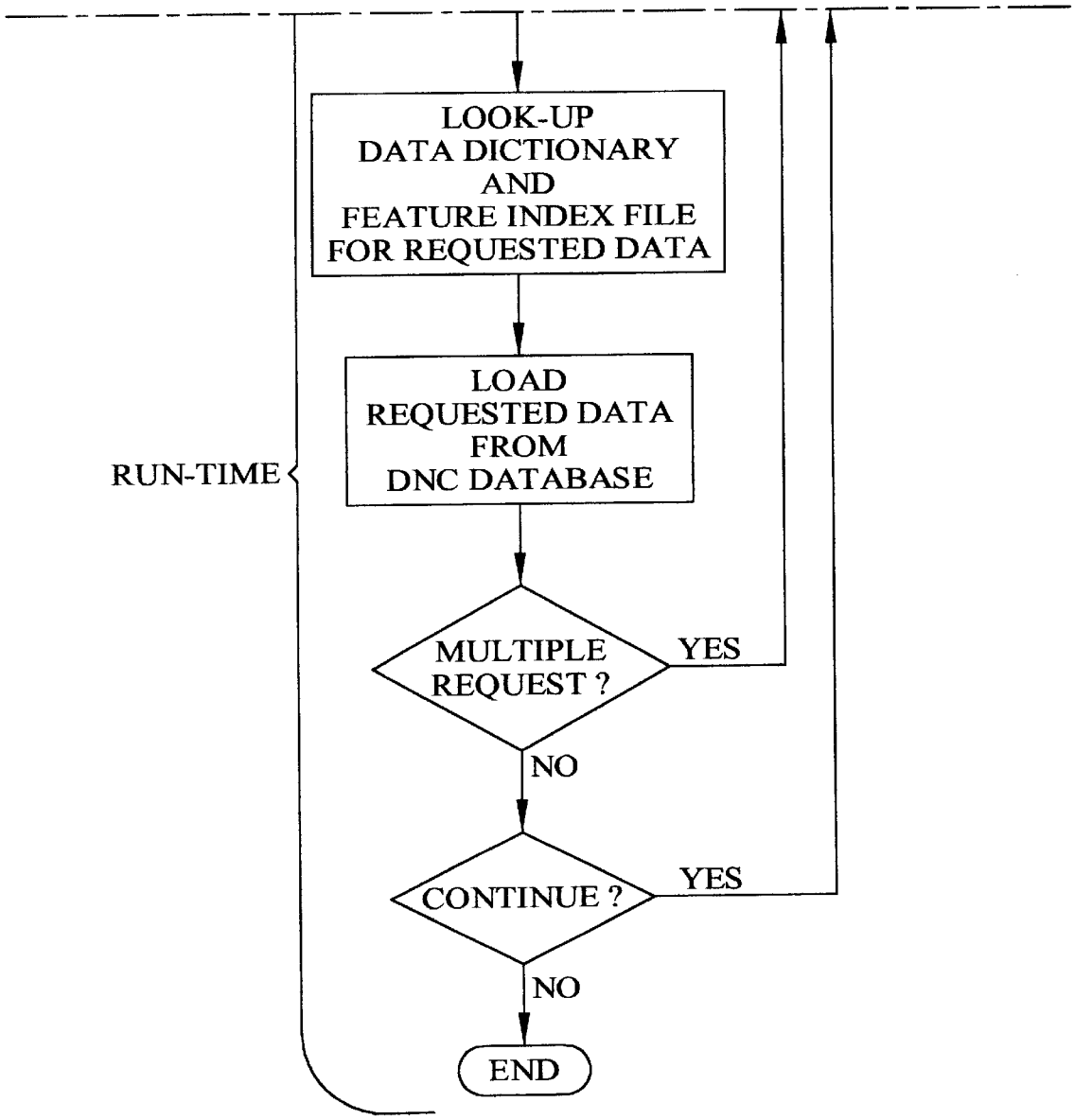

FIG. 3 is a flowchart of an exemplary DNC database server 112. During initialization, the CD-ROM volume containing DNC database 114 is opened. A data dictionary and feature index are stored or retrieved to reduce the time required to access charts from DNC database 114. During run-time, command messages are input from MMI 110 and the requested chart data are located from the data dictionary and feature index. The requested data is then loaded from DNC database 114 into shared memory, for example, for display by MMI 110. The next command is then input from MMI 110 and the cycle repeats as long as operation continues.

Automated navigation system 10 may also include other optional functions for displaying alternate nautical chart data for a selected position including harbor, approach, and coastal; of plotting a course on a chart overlay; and for updating the Digital Nautical Chart database.

An exemplary computer program for practicing the present invention on a computer is presented in the attached Microfiche Appendix having 1 microfiche and 192 frames.

Other modifications, variations, and applications of the present invention may be made in accordance with the above teachings other than as specifically described to practice the invention within the scope of the following claim.

We claim:

1. An automated charting system comprising:

a Global Positioning System receiver;

a navigation input;

an operator input;

a display;

a man-machine interface coupled to the Global Positioning System receiver, the navigation input, the operator input, and the display;

a DNC database server coupled to the man-machine interface;

and a DNC database.

* * * * *